Feb. 15, 1966   L. D. BRIDGE   3,235,720
VEHICLE LIGHT ASSEMBLY
Filed Aug. 13, 1963
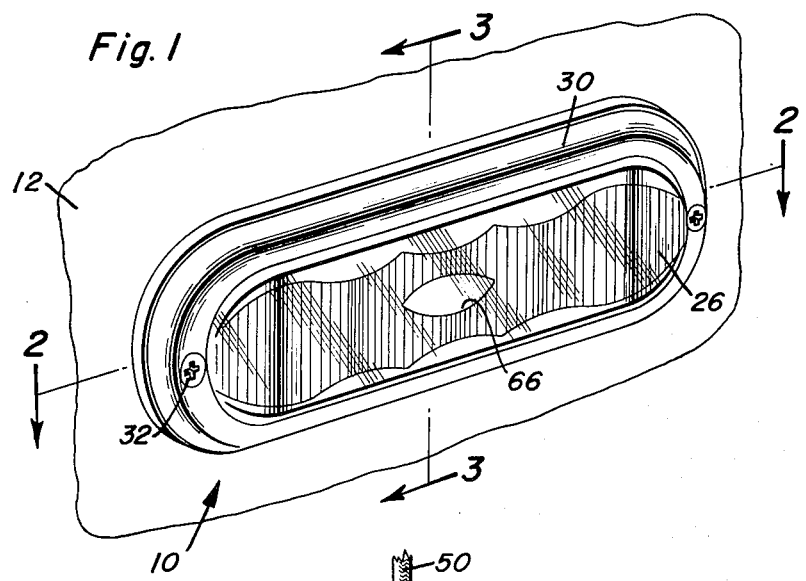
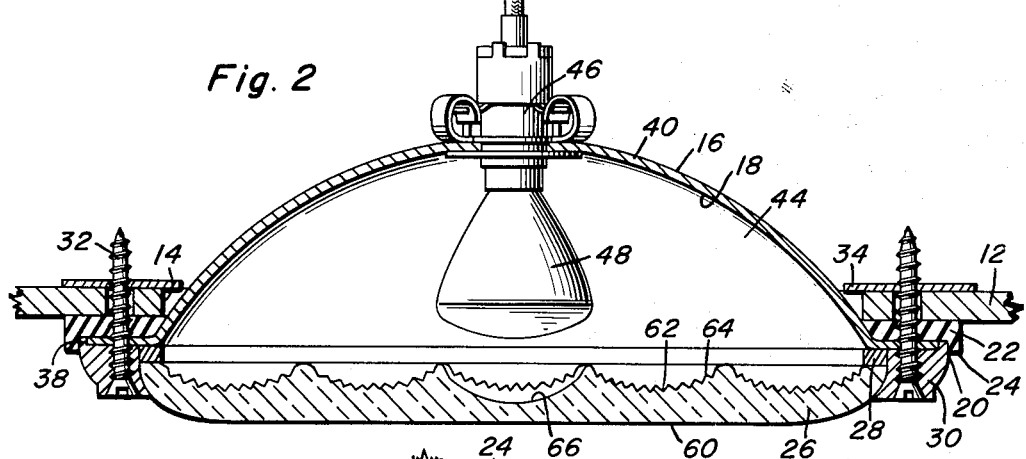
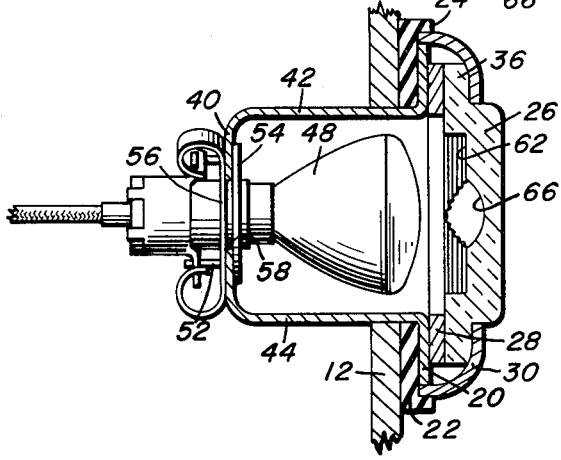
Lawrence D. Bridge
INVENTOR.

3,235,720
VEHICLE LIGHT ASSEMBLY
Lawrence D. Bridge, Latrobe, Pa., assignor to L. D. Bridge Company, Inc., Latrobe, Pa., a corporation of Pennsylvania
Filed Aug. 13, 1963, Ser. No. 301,824
5 Claims. (Cl. 240—8.2)

The present invention generally relates to a light construction and more particularly a light for use in combination with various types of vehicles such as an automobile or the like and includes in its structure a novel arrangement of reflector and lens whereby a light beam produced by the light is laterally or horizontally elongated and vertically narrow.

The present invention is constructed primarily for placement in the sides of a vehicle, such as in the area of the front fender just forwardly of the front door of the vehicle and adjacent the bottom thereof for illuminating the area of the roadway laterally of the vehicle to illuminate the area in which passengers or the driver of the vehicle step when they are getting into or out of the vehicle at night. Of course, the present invention may also be effectively employed on various types of boats where the broad beam of light produces a measure of safety and the light may also be employed as a headlight for motor vehicles, a tail light or stop light for vehicles and may also be employed on tractors, airplanes or any other type of vehicle desired. Another advantage of the light when placed on the side of the vehicle is that it prevents small animals such as wild game and also larger animals such as deer from running into or under the vehicle at night thereby aiding in the preservation of wildlife.

Another advantage of the present light construction is that it produces a relatively broad but vertically narrow beam of light which is advantageous during adverse weather conditions in that this beam glows under fog, snow or rain rather than being reflected upwardly thus giving the driver of a vehicle much better vision at night during adverse weather conditions. This light also will enable drivers approaching the vehicle from the side to readily discern the vehicle thus aiding in night driving. Also, this light will illuminate the side area of the vehicle for facilitating roadside repairs such as changing tires and the like.

An object of the present invention is to provide a safety light for a vehicle having a novel reflector and lens assembly which will produce a relatively horizontally broad but vertically narrow light beam which is moisture resistant, dust resistant, corrosion resistant, vibration resistant and relatively inexpensive to manufacture and easy to install.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the light assembly of the present invention and illustrating the assembly mounted in a vehicle panel such as the top corner panel immediately forwardly of the front door of a vehicle and rearwardly of the front wheel generally toward the bottom of the vehicle;

FIGURE 2 is a longitudinal, plan sectional view taken substantially upon a plane passing along section line 2—2 of FIGURE 1 illustrating further structural details of the invention;

FIGURE 3 is a transverse, vertical sectional view taken substantially upon a plane passing along section line 3—3 of FIGURE 1 illustrating further structural details of the reflector and lens assembly illustrated in the relationship thereof and the relationship of the bulb thereto.

Referring now specifically to the drawings, the safety light 10 of the present invention is mounted in a vehicular panel 12 such as the forward quarter panel or center panel located between the front wheel well of the vehicle and the front door and preferably below the center line of the wheel although the vertical orientation and horizontal orientation of the light may vary as desired. It may be orientated at the front end of the vehicle for use as a parking light or for use as a head lamp and may be orientated at the rear of the vehicle for use as a tail light or as a stop light as desired. The light assembly 10 may also be employed effectively on a boat of any suitable type and also on other types of vehicles as desired. The panel 12 is provided with an opening 14 which receives a portion of the light assembly and this opening is formed in any suitable manner.

The light assembly 10 includes a combined reflector and casing unit 16 which not only serves as a casing for the light but also has a reflecting surface 18 on the interior thereof. The periphery of the reflector 16 is provided with a peripheral flange 20 which is parallel to the body panel 12 when installed thereon. Underlying the flange 20 is an annular gasket or seal 22 of resilient material such as rubber, neoprene or the like and the gasket 22 lies between the flange 20 and the body panel 12 and the external periphery of the gasket 22 is provided with a laterally projecting lip 24 which extends laterally outwardly beyond the edge of the flange 20 in slightly spaced relation thereto as illustrated in FIGURES 2 and 3.

A lens 26 forms a closure for the reflector casing 16 and has a peripheral edge spaced from the flange 20 by an annular sealing gasket 28. The peripheral edge of the lens 26 is arcuately curved and is engaged by an annular retaining ring 30 which may be of any suitable material but has a chrome external surface for purposes of providing an attractive unit. A pair of retaining screws 32 is inserted through apertures in the annular retaining ring 30, through apertures in the flange 20 and apertures in the gasket or seal 22 and through apertures in the body panel 12 with the screw threaded members 32 being in locking engagement with retaining nuts 34. In lieu of this, the screw members 32 may be sheet metal screws for attachment directly to the body panel or any suitable type of nut and screw assembly may be employed for detachably retaining the ring 30 as well as the remainder of the light assembly in mounted relation on the body panel 12.

As illustrated in FIGURE 3, the major portion of the periphery of the lens 26 is provided with a projecting flange 36 but where the mounting screws are provided, the flange 36 is omitted and the annular ring 30 is formed in a solid manner to provide rigidity to the ring where the screws 32 extend therethrough with this arrangement being illustrated in FIGURE 2. Further, the sealing gasket 28 between the periphery of the lens 26 and the flange 20 conforms in shape and configuration to the peripheral flange 36 on the lens 26.

Also, the periphery of the retaining ring 32 is provided with a projecting lip 38 which extends between the periphery of the flange 20 and the projecting lip 24 on the sealing gasket 22 thus bringing the retaining ring 30 sealingly into contact with the gasket 20 and completely encompassing or enclosing the flange 20 and the reflector unit 18. Thus, by virtue of the sealing gasket 20 and the sealing gasket 28 and the fact that the retaining ring 30 sealingly engages both of these gaskets, so the interior of the casing or reflector 16 will be retained in a moisture-proof and dust-proof condition.

As illustrated in FIGURES 2 and 3, the vertical wall 40 of the reflector 16 is arcuately curved to provide a concave inner surface. The top wall 42 and the bottom wall 44 of the reflector 16 are parallel to each other and perpendicular to the vertical wall 40 as illustrated particularly in FIGURE 3. Disposed centrally in the vertical wall 40 is a light socket 46 having a bulb 48 detachably mounted therein and being provided with an electrical conductor 50 connected thereto. The lamp socket 46 is retained in sealed relation on the casing or reflector 16 in any suitable manner such as by the retaining lug 52 and flanges 54 and 56 which engage opposite sides of an aperture 58 in the vertical wall 40 thereby mounting the lamp socket in place in a detachable manner.

As illustrated, the entire light assembly 10 is horizontally elongated with the lens being generally oval-shaped in configuration as is the retaining ring, gasket 28 and 22 as well as the flange 20 on the casing or reflector 16.

The lens 26 has a generally flat outer surface 60 and a plurality of vertically extending concave areas 62 each having a series of ridges and grooves 64 therein. The central concave area 62 is provided with a centrally disposed transverse arcuate concave cut-out recess 66 which is concave horizontally as illustrated in FIGURE 2 and also concave vertically as illustrated in FIGURE 3, with the ends of the concave recess 66 tapering and converging to merge with the ridges defining the concave vertical areas 62. The vertical concavity 62 and the ridges and valleys formed therein and particularly the concave recess 66 orientates the light beam emitted from the lens in a generally horizontally broad and vertically narrow pattern which is also accomplished by the particular configuration of the reflector and the parallel top and bottom walls thereof and the relatively narrow vertical dimension of the reflector in its relationship to the light bulb.

The materials from which the components of the light assembly are constructed may be conventional in their application with the gaskets being either rubber, neoprene or the like and, in fact, cork gaskets can be employed if desired.

In actual tests, a 32-candle power bulb operated from a six volt battery maintains a high candle power rating at a given distance and at relatively wide angles to both the left and right of the center line of the light. However, the candle power above and below the horizontal plane of the center line is markedly reduced as the degree of elevation or depression increases. This is believed due to the suppression of the vertical rays by the reflector and due to the concave structure of the recess immediately forwardly of the light bulb and the vertical concave areas 62 and the ridges 64 formed therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle light assembly comprising a reflector member having a peripheral flange, a lens overlying the reflector and including a flange overlying the flange on the reflector, a retaining ring engaging the flange of the reflector, fastener means extending through the retaining ring, lens flange and reflector flange and into a supporting panel for retaining the assembly in assembled condition and supported from the supporting panel, said reflector including an arcuate vertical wall, and parallel top and bottom walls perpendicular to the vertical wall, and a light socket assembly mounted centrally from the vertical wall intermediate the top and bottom walls for producing a horizontally elongated and vertically narrow beam of light, said lens being provided with a plurality of vertically orientated parallel concave recesses, each of said recesses having a plurality of vertical ridges and valleys formed therein, and a centrally disposed concave recess in the inner surface of the lens in alignment with the light socket assembly for orientation adjacent a light bulb therein, said central recess being concave both laterally and vertically whereby light rays passing outwardly of the lens will be vertically suppressed by the reflector and the lens.

2. A vehicle light assembly comprising a reflector member having a peripheral flange, a lens overlying the reflector and including a flange overlying the flange on the reflector, a retaining ring engaging the flange of the reflector, fastener means extending through the retaining ring, lens flange and reflector flange and into a supporting panel for retaining the assembly in assembled condition and supported from the supporting panel, said reflector including an arcuate vertical wall, and parallel top and bottom walls perpendicular to the vertical wall, and a light socket assembly mounted centrally from the vertical wall intermediate the top and bottom walls for producing a horizontally elongated and vertically narrow beam of light, said lens being provided with a plurality of vertically orientated parallel concave recesses, each of said recesses having a plurality of vertical ridges and valleys formed therein, and a centrally disposed concave recess in the inner surface of the lens in alignment with the light socket assembly for orientation adjacent a light bulb therein, said central recess being concave both laterally and vertically whereby light rays passing outwardly of the lens will be vertically suppressed by the reflector and the lens, the flange on the reflector engaging a sealing gasket between it and the supporting panel, said sealing gasket enclosing the periphery of the flange on the reflector in spaced relation thereto, said retainer ring enclosing the reflector and engaging the gasket for sealing the interior of the reflector, an annular gasket between the lens and the reflector flange for further sealing the interior of the reflector.

3. A light assembly comprising a reflector having a peripheral flange, a lens overlying the reflector and including a flange overlying the flange on the reflector, retaining means securing the flanges of the reflector and lens together, said reflector including an arcuate wall defining a concave inner surface, parallel top and bottom walls perpendicular to the arcuate wall, a light source mounted centrally of the arcuate wall intermediate the top and bottom walls, said lens including a concave recess portion substantially in the center thereof, said recess portion being of a greater lateral dimension than vertical dimension whereby said light assembly will emit a horizontal elongated and vertically narrow beam of light.

4. A vehicle light assembly comprising a reflector member having a peripheral flange, a lens overlying the reflector and including a flange overlying the flange on the reflector, a retaining ring engaging the flange of the reflector, fastener means extending through the retaining ring, lens flange and reflector flange and into a supporting panel for retaining the assembly in assembled condition and supported from the supporting panel, said reflector including an arcuate vertical wall, and parallel top and bottom walls perpendicular to the vertical wall, and a light socket assembly mounted centrally from the vertical wall intermediate the top and bottom walls for producing a horizontally elongated and vertically narrow beam of light, said lens being provided with a plurailty of vertically oriented parallel concave recesses, each of said recesses having a plurality of vertical ridges and valleys formed therein, and a centrally disposed concave recess in the inner surface of the lens in alignment with the light socket assembly for orientation adjacent a light bulb therein, said central recess being concave both laterally and vertically, and said central recess being of a greater lateral dimension than vertical dimension whereby light rays passing outwardly of said lens will be vertically suppressed by the reflector and the lens.

5. A vehicle light assembly comprising a reflector member having a peripheral flange, a lens overlying the reflector and including a flange overlying the flange on the reflector, a retaining ring engaging the flange of the reflector, fastener means extending through the retaining ring, lens flange and reflector flange and into a supporting panel for retaining the assembly in assembled condition and supported from the supporting panel, said reflector including an arcuate vertical wall and parallel top and bottom walls perpendicular to the vertical wall, and a light socket assembly mounted centrally from the vertical wall intermediate the top and bottom walls for producing a horizontally elongated and vertically narrow beam of light, said flange on the reflector engaging a sealing gasket between it and the supporting panel, said sealing gasket enclosing the periphery of the flange on the reflector in spaced relation thereto, said retainer ring enclosing a reflector and engaging the gasket for sealing the interior of the reflector, and an annular gasket between the lens and the reflector flange for further sealing the interior of the reflector.

References Cited by the Examiner
UNITED STATES PATENTS

| | | | |
|---|---|---|---|
| 922,958 | 5/1909 | Ryan | 240—36 X |
| 1,624,436 | 4/1927 | Rosemier | 240—41.35 X |
| 2,143,435 | 1/1939 | Dietrich | 240—41.3 |
| 2,542,114 | 2/1951 | Bridge | 240—106.1 |
| 2,640,910 | 6/1953 | Talley | 240—7.1 |
| 2,876,340 | 3/1959 | Williams | 240—151 |

NORTON ANSHER, *Primary Examiner.*